(12) United States Patent
Asak et al.

(10) Patent No.: US 8,936,481 B2
(45) Date of Patent: Jan. 20, 2015

(54) POWER CABLE TERMINATION ARRANGEMENT

(71) Applicant: Vetco Gray Scandinavia AS, Sandvika (NO)

(72) Inventors: Marius Asak, Oslo (NO); Erik Raad, Oslo (NO); Odd Are Haugen, Asgardstrand (NO); Knut Arne Henjum, Oslo (NO)

(73) Assignee: Vetco Gray Scandinavia AS, Sandvika (NO)

( * ) Notice: Subject to any disclaimer, the term of this patent is extended or adjusted under 35 U.S.C. 154(b) by 80 days.

(21) Appl. No.: 13/784,982

(22) Filed: Mar. 5, 2013

(65) Prior Publication Data

US 2013/0230997 A1   Sep. 5, 2013

(30) Foreign Application Priority Data

Mar. 5, 2012 (EP) ..................................... 12001478

(51) Int. Cl.

| | |
|---|---|
| *H01R 13/52* | (2006.01) |
| *H01R 13/523* | (2006.01) |
| *H02G 15/013* | (2006.01) |
| *H01R 4/20* | (2006.01) |
| *H02G 15/04* | (2006.01) |

(52) U.S. Cl.
CPC ........ *H01R 13/5221* (2013.01); *H01R 13/5219* (2013.01); *H01R 13/523* (2013.01); *H02G 15/013* (2013.01); *H01R 4/20* (2013.01); *H02G 15/04* (2013.01)
USPC ......................................................... 439/275

(58) Field of Classification Search
CPC ............................ H01R 13/5208; H01R 33/22
USPC .......................... 439/275, 321–323, 252–255
See application file for complete search history.

(56) References Cited

U.S. PATENT DOCUMENTS

| | | | | |
|---|---|---|---|---|
| 3,844,923 | A |  | 10/1974 | Sandrock |
| 5,112,087 | A | * | 5/1992 | Haruki ........................... 285/101 |
| 5,192,219 | A | * | 3/1993 | Fowler et al. ................. 439/321 |
| 5,993,266 | A | * | 11/1999 | Mayer et al. .................. 439/680 |
| 6,042,422 | A | * | 3/2000 | Youtsey ......................... 439/585 |

(Continued)

FOREIGN PATENT DOCUMENTS

| | | |
|---|---|---|
| FR | 2920599 A1 | 3/2009 |
| WO | 2006134108 A1 | 12/2006 |

OTHER PUBLICATIONS

EP Search Report for EP Appl. No. 12001478.2, dated Aug. 13, 2012.

*Primary Examiner* — Phuongchi Nguyen
(74) *Attorney, Agent, or Firm* — Bracewell & Giuliani LLP

(57) ABSTRACT

A power cable termination arrangement is disclosed, comprising an electrically conductive closed-end sleeve (10) configured to be inserted on an end of the power cable. The sleeve is internally formed with a constriction (13) that separates a forward sleeve section (11) from a rearward sleeve section (14), wherein the forward sleeve section (11) is configured to establish, by radial crimping, electrical and mechanical connection between the sleeve and a bare end (5) of a power cable conductor (2), the rearward sleeve section (14) reaching from said constriction towards an insert end configured to receive the power cable in sealing contact between an insulated portion (3) of the power cable and a sealing ring (16) carried internally in the rear sleeve section (14).

8 Claims, 2 Drawing Sheets

(56) References Cited

U.S. PATENT DOCUMENTS

| | | |
|---|---|---|
| 7,249,968 B1 | 7/2007 | Fish et al. |
| 2002/0050385 A1 | 5/2002 | Murakami et al. |
| 2007/0169954 A1 | 7/2007 | Bertini et al. |

* cited by examiner

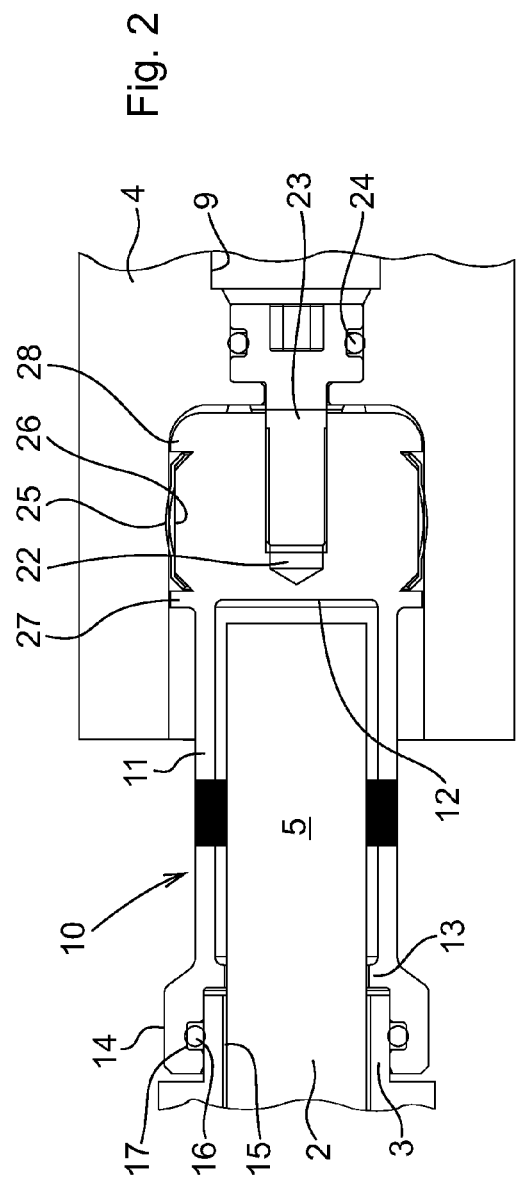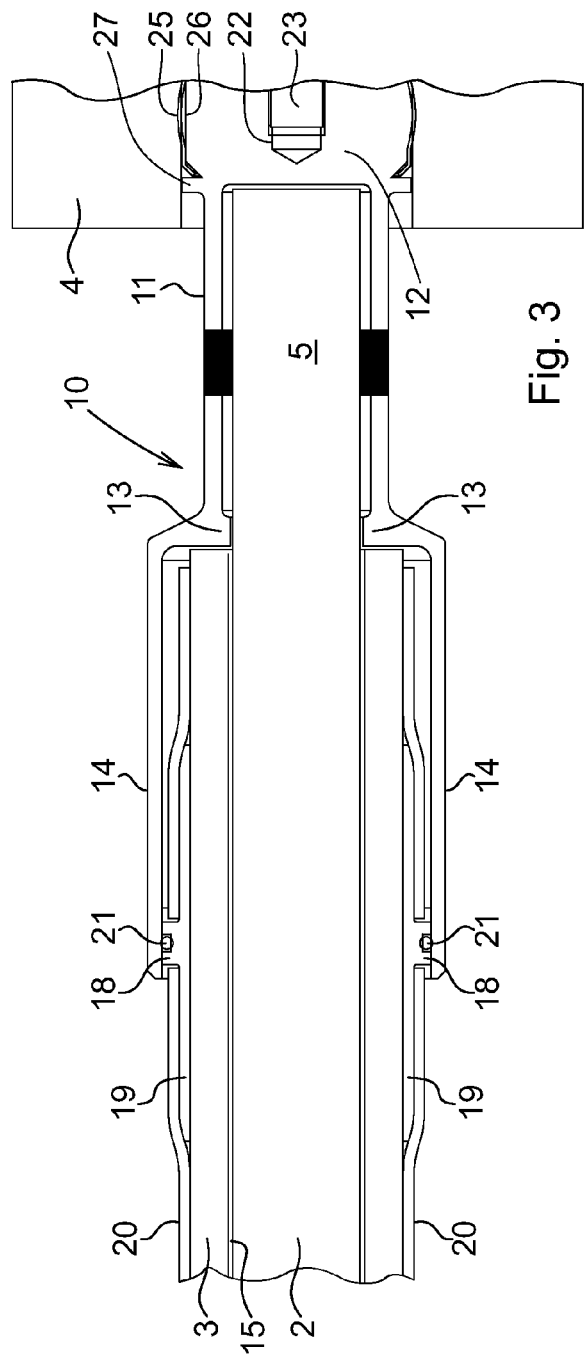
Fig. 2
Fig. 3

POWER CABLE TERMINATION ARRANGEMENT

TECHNICAL FIELD OF THE INVENTION

The present invention relates to the field of power supply to submerged electrical equipment via underwater power cables, and relates particularly to arrangements for termination of a power cable in a subsea connector by which electrical power is introduced in a power consumer, or transferred to a mating connector of an extension power cable.

BACKGROUND AND PRIOR ART

The power cables referred to include a conductor which is dimensioned for supply of medium or high voltage electrical power, i.e. in the order of about 1-10 kV and above, and from 1 A and above, below sea level. The conductor is typically made up of a bundle or bundles of individual copper strands enclosed in a polymer insulation which is covered by a protective outer shield, often made of metal.

A de-scaled end of the cable is secured in a connector housing wherein the cable termination components are embedded in dielectric material and protected by oil.

Conventionally, the bare conductor end is clamped in one end of a receptor element which is secured in the connector and which is formed, in the opposite end, with a male or a female contact interface. In this hitherto widely used design, the interface between the conductor and the cable insulation lies open where the bare conductor meets the insulation. Oil and foreign material may thus immigrate into the cable. On the other hand gas, liquid and particles may pass this open interface and reach into areas of high electrical fields in the connector, occasionally causing partial electrical discharge.

SUMMARY OF THE INVENTION

The object of the present invention is to provide a power cable termination arrangement by which the risk of partial electrical discharge, related to intrusion by foreign material or gases, can be avoided.

Briefly, this object is met by a power cable termination arrangement comprising an electrically conductive closed-end sleeve configured to be inserted on an end of the power cable, the sleeve internally formed with a constriction that separates a forward sleeve section from a rearward sleeve section, the forward sleeve section configured to establish, by radial crimping, electrical and mechanical connection between the sleeve and a bare end of a power cable conductor, the rearward sleeve section reaching from said constriction towards an insert end configured to receive the power cable in sealing contact between the sleeve and an insulated portion of the power cable. The rearward section of the sleeve is formed internally with a seat configured to receive an elastomeric sealing ring insertable on the insulated portion of the power cable. A leakage tight sealing contact between the sleeve and the insulated portion of the power cable is thus established by the sealing ring.

In particular, a seal arranged as disclosed may be used to establish a leakage tight sealing contact between the sleeve and an XLPE-insulated portion of a high voltage power cable for subsea use. Sealing is this way accomplished without any deforming engagement with the insulation.

A sealed enclosure of the power cable end in the connector is this way provided to prevent intrusion and longitudinal transport of gas, of liquid or particles, in the cable. More precisely, the new cable termination arrangement effects encapsulation of the bare conductor end in a sealed volume defined between the closed end of the sleeve and the sealed area which is established at the insert end of the sleeve, the rearward section of the sleeve encapsulating the region of the power cable where the bare conductor meets the cable insulation.

In a preferred embodiment the constriction is realized as a continuous shoulder projecting radially inwards from the inside wall of the sleeve, the shoulder defining a central bore dimensioned for insertion of the bare conductor end. In a region of its insert end, the sleeve is internally formed to establish continuous sealing contact about the power cable.

In alternative embodiment, the rearward section of the sleeve may be formed with an inner dimension adapted for insertion of a ring-shaped flange that projects radially from a separate sealing sleeve, securable on the insulated portion of the power cable.

From the above it is clear that current is drawn from the power cable conductor via the sleeve into the coupling interface supplied by the connector. More precisely, the sleeve is configured to be fitted into a seat that opens in one end of a receptor element, the other end of which carries a female coupling interface.

Anchoring of the sleeve in the receptor can be accomplished by means of a threaded anchoring bolt that is insertable from the coupling interface end of the receptor to engage an axial, internally threaded blind bore that opens centrally in the closed end of the sleeve.

Electrical contact between the sleeve and the receptor is advantageously accomplished by means of a separate contact element securable on the exterior of the sleeve, in a region of its closed end. The contact element is seated in the outer periphery of the sleeve, in position to engage the inside wall of the receptor.

In a preferred embodiment, electrical contact is established by means of contact lamellae which are arranged circumferentially about the sleeve. To this purpose, the sleeve may be formed with a head portion forming the closed end of the sleeve. A seat for the lamella contact is provided as a groove that runs continuously about the head portion, in the center of which the blind bore is axially extended to a depth that leaves a non-broken end wall in the sleeve. It is preferred that the seat for the lamella contact is in both axial directions defined between head portions of full radius to provide guidance of the sleeve as the sleeve is pulled in into the receptor by means of turning the anchoring bolt.

SHORT DESCRIPTION OF THE DRAWINGS

Embodiments of the invention will be described below with reference to the accompanying, schematic drawings, in the drawings:

FIG. 2 is a corresponding section through a first embodiment of the new cable termination arrangement, and FIG. 3 is a corresponding section through a second embodiment of the new cable termination arrangement.

DETAILED DESCRIPTION OF PREFERRED EMBODIMENTS

Figure 1:
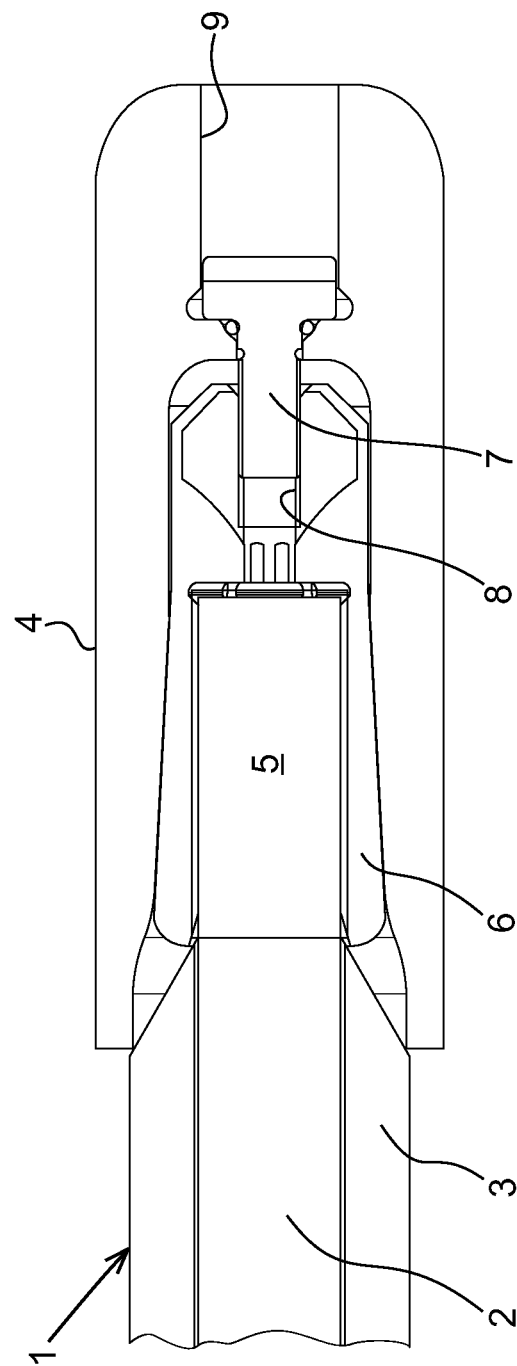
FIG. 1 is a longitudinal section through a prior art cable termination arrangement.

A prior art power cable termination arrangement in a connector is illustrated in FIG. 1. A power cable 1, comprising a stranded conductor 2 inside cable insulation 3, is anchored in a receptor 4. A bare end 5 of the conductor is inserted from the open rear end of a clamp cone 6 with a conical outer shape.

The clamp cone 6 is longitudinally slotted to apply radial pressure towards the bare conductor as the clamp cone is pulled in to be anchored in a conical seat formed in the receptor. Anchoring of the clamp cone in the receptor is accomplished by means of a threaded bolt 7 which engages a threaded bore 8 opening in the forward end of the clamp cone. The bolt 7 is introduced through a bore 9 forming a female coupling interface in the forward end of the receptor.

The power cable termination arrangement is typically embedded in a solid body of dielectric material that is mounted in an oil-filled and pressure-compensated metal connector housing, structured for underwater application. However, while not forming part of the present invention, the complementary connector components which are well known to a skilled person and can be conventionally applied, will not be further discussed in the disclosure.

FIG. 2 illustrates a first embodiment of the new power cable termination arrangement. The bare end 5 of the conductor 2 is inserted in a sleeve 10 made of electrically conductive material, such as copper, aluminum, or other suitable metal or metal alloy. The sleeve 10 is rotationally symmetric, comprising a forward section 11 reaching from a closed forward end 12 to a constriction 13 formed internally in the sleeve 10. The constriction 13 is realized as a radial shoulder 13 projecting inwards from the inside wall of the sleeve. A central bore in the shoulder is dimensioned for insertion of the bare conductor end 5 into the forward section of the sleeve 10. The sleeve is further extended rearwards from the constriction 13, towards an insert end via which the power cable 1 is introduced into the sleeve 10. This rearward section 14 is configured to receive the power cable in sealing contact between the sleeve and the insulation 3 surrounding the conductor 2.

In the subject high voltage, subsea power cable application, the insulation 3 will typically be an XLPE (cross linked polyethylene) tubing which is preferred due to its dielectric properties and rated maximum conductor temperature, rendering the XLPE-insulated high voltage power cable particularly useful or required in subsea applications.

The sleeve 10 is mechanically and electrically fixed to the bare conductor end 5 through a crimping procedure by which the inner diameter in a portion of the forward sleeve section 11 is permanently reduced in order to fix the sleeve about the bare conductor. Crimping may be accomplished by any appropriate cold crimping procedure to effect a permanent deformation of a portion of the forward section 11 of the sleeve. Crimping is advantageously applied in a middle position of the forward sleeve section, as illustrated through shadowed areas in the drawings, The conductor end 5 is this way encapsulated by the forward section 11 of the sleeve.

An annular volume about the bare conductor end is this way defined inside the sleeve, the annular volume delimited between the closed end 12 and the seal about the power cable at the insert end of the sleeve. This annular volume may be filled with dielectric material, such as oil, upon crimping of the sleeve. The interface 15 between the conductor 2 and the insulation 3, which lies open where the bare conductor meets the insulated portion of the power cable, is this way effectively encapsulated and sealed off from the surroundings in the connector.

In the embodiment of FIG. 2, sealing between the sleeve 10 and the insulation 3 is accomplished by means of an elastomeric sealing ring 16 which is accommodated in a seat 17 that runs continuously about the inside wall of the sleeve, in the region of its insert end. Sealing by sealing ring 16 is established upon insertion of the sleeve 10 onto the power cable. The sealing ring 16 effectively prevents passage of fluid or particles in both directions.

The embodiment of FIG. 3 differs from the embodiment of FIG. 2 merely with respect to the configuration of the sealed contact between the sleeve 10 and the insulation 3. In the embodiment of FIG. 3 the rearward section 14 is formed with an inner diameter that is adapted for passing the sleeve over a flange 18 which projects radially outwards from a sealing sleeve 19 that is slipped over the power cable. The sealing sleeve 19 may be anchored on the power cable by means of shrinkable tubing. Cold shrink tubing 20 may advantageously be arranged axially on both sides of the flange 18 to cover the opposite ends of the sealing sleeve 19, a forward shrink tube member sealing against leakage from the power cable into the cable termination assembly, and a rearward shrink tube member sealing against leakage from the termination assembly into the power cable.

An elastomeric sealing ring 21 is accommodated in a seat formed in the periphery of the flange 18, to establish sealing contact with the inside wall of the rearward section 14 of the sleeve 10 and effectively preventing passage of fluid and particles in both directions.

In both embodiments, the closed end of the sleeve 10 forms a head 12 by which the sleeve 10 can be anchored in the receptor 4. To this purpose, a threaded blind bore 22 opens in the center of the forward end of the sleeve 10 (see FIG. 2). A threaded bolt 23 is insertable from the forward end of the receptor to engage the threaded bore 22. A sealing ring 24, seated in the bolt head, prevents intrusion of fluid and particles via the female coupling interface 9 formed in the forward end of the receptor.

On its periphery, the sleeve 10 carries a contact element 25 via which electrical connection between the cable conductor 2 and the receptor 4 is established as the power cable is anchored in the receptor. In the illustrated embodiments, the contact element is realized in the form of lamella contacts 25 accommodated in a seat 26 that runs about the periphery of the head 12. Advantageously, the seat 26 is in both axial directions defined between head portions 27, 28 of full radius, providing guidance of the sleeve 10 as the sleeve is pulled in into the receptor 4 by means of turning the bolt 23.

Each of the embodiments disclosed above provides a power cable termination arrangement by which intrusion and longitudinal transport of foreign material in the power cable is prevented, and the risk of partial electrical discharge in the connector is abolished, in result of effectively encapsulating the bare conductor end as well as the interface between the conductor and the cable insulation. Modification of the illustrated design of components is possible without departing from this teaching, which is reflected in appended claims.

The invention claimed is:

1. A power cable termination arrangement, comprising an electrically conductive closed-end sleeve (10) configured to be inserted on an end of the power cable, the sleeve is internally formed with a constriction (13) that separates a forward sleeve section (11) from a rearward sleeve section (14), wherein the forward sleeve section (11) is configured to establish, by radial crimping, electrical and mechanical connection between the sleeve and a bare end (5) of a power cable conductor (2), the rearward sleeve section (14) reaching from said constriction towards an insert end configured to receive the power cable in sealing contact between the sleeve and an insulated portion (3) of the power cable, wherein the rearward section (14) of the sleeve is internally formed with a seat (17) configured to receive an elastomeric sealing ring (16) insertable on the insulated portion of the power cable, establishing by the sealing ring (16) a leakage tight sealing contact between the sleeve and the insulated portion of the power cable.

2. The arrangement of claim 1, wherein the insulated portion of the power cable is an XLPE-insulated high voltage power cable for subsea use.

3. The arrangement of claim 1, wherein the constriction (13) is a continuous shoulder projecting radially inwards from the inside wall of the sleeve, the shoulder defining a central bore dimensioned for insertion of the bare conductor.

4. The arrangement of claim 1, wherein the rearward section (14) of the sleeve is formed with an inner dimension adapted for insertion of a ring-shaped flange (18) projecting radially from a separate sealing sleeve (19) that is securable on the power cable insulation.

5. The arrangement of claim 1, wherein an axial, internally threaded blind bore (22) for an anchoring bolt (23) opens centrally in the closed end (12) of the sleeve.

6. The arrangement of claim 1, wherein the closed end of the sleeve forms a head (12) providing guidance (27, 28) of the sleeve as the sleeve is pulled in into a receptor (4) by means of turning the anchoring bolt (23).

7. The arrangement of claim 1, wherein the sleeve in a region of its closed end is externally formed with a seat (26) configured to receive a contact element (25) to be supported on the outer periphery of the sleeve.

8. The arrangement of claim 7, wherein the contact element (25) is a lamella contact arranged circumferentially about the sleeve.

\* \* \* \* \*